(12) United States Patent
Nobusawa et al.

(10) Patent No.: US 6,332,115 B1
(45) Date of Patent: Dec. 18, 2001

(54) VELOCITY CALCULATING DEVICE AND HOOD RAISING SYSTEM

(75) Inventors: Hisashi Nobusawa; Hideo Takai, both of Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/181,558

(22) Filed: Oct. 29, 1998

(30) Foreign Application Priority Data

Nov. 5, 1997 (JP) ........................................................ 9-302994

(51) Int. Cl.$^7$ ............................. G06F 17/00; B62D 25/12
(52) U.S. Cl. ............................. 702/142; 701/70; 701/78; 180/274
(58) Field of Search .................................. 701/70, 71, 75, 701/78, 79, 81; 702/142; 180/274; 296/194

(56) References Cited

U.S. PATENT DOCUMENTS

| 4,249,632 | 2/1981 | Lucchini et al. ..................... 701/74 |
| 5,072,393 | 12/1991 | Mori et al. ........................... 701/70 |
| 5,343,396 * | 8/1994 | Youngblood ......................... 701/70 |
| 5,418,724 * | 5/1995 | Iiboshi ................................. 701/80 |
| 5,608,631 * | 3/1997 | Tsutsumi et al. ..................... 701/74 |

FOREIGN PATENT DOCUMENTS

97/18108    5/1997   (WO) .

* cited by examiner

*Primary Examiner*—Kamini Shah
(74) *Attorney, Agent, or Firm*—McDermott, Will & Emery (57) ABSTRACT

A velocity calculating device and a hood raising apparatus for a vehicle are provided. In order to calculating velocity of the vehicle, velocity pulse signals from a velocity sensor 5 are inputted to a CPU 33. Further, it is executed to calculate average velocity V2 at intervals of a standard period T2 and acceleration α at intervals of a period Tb on the basis of the velocity pulse signals. Next, on the basis of the calculated average velocity V2 and the acceleration α, momentary velocity V3 at intervals of the period Tb is calculated. It is carried out to measure a passing of time t3 from the input of velocity pulse signal till a time when the output of calculation results is required, while momentary velocity V4 at a point of time when the output of calculation results is required is estimated on the basis of the momentary velocity V3 and the acceleration α.

6 Claims, 8 Drawing Sheets

VELOCITY CALCULATING DEVICE AND HOOD RAISING SYSTEM

BACKGROUND OF THE INVENTION

1. Field of the Invention

The present invention relates to a velocity calculating device which is capable of estimating momentary velocity of a vehicle precisely when it collides and a hood raising system which is capable of raising a hood of the vehicle on the basis of the momentary velocity thereby to protect an object from being damaged.

2. Description of Related Art

A conventional hood raising system operates as follows. When the vehicle on traveling collides against the object, then the system detects the collision by a touch sensor and simultaneously operates to raise a hood arranged on the front side of the vehicle to prevent the object from colliding with rigid components, such as an engine, through the intermediary of the hood, thereby protecting the object.

In the above hood raising system, a velocity calculating device calculates an average velocity at intervals of predetermined times as a standard on the basis of velocity pulse signals generated from a vehicle velocity sensor. Also, the system is so constructed as to raise the hood when the so-calculated average velocity is within a predetermined range as a standard, thereby distinguishing from normal collisions.

SUMMARY OF THE INVENTION

In the conventional hood raising system, however, it is supposed that the detected velocity has luck reliability due to a large error. For example, if a brake pedal is stepped rapidly to lock vehicle wheels, then the above-mentioned average velocity would become zero.

It is therefore an object of the present invention to provide a velocity calculating device which can estimate a precise momentary speed and also provide a hood raising system which can raise a hood on the vehicle on the basis of the momentary velocity thereby to protect an object in front of the vehicle.

The above object of the present invention described above can be accomplished by a velocity calculating device for a vehicle comprising:

an average velocity calculating unit which inputs velocity pulse signals representing rotating speed of wheels of the vehicle to calculate an average velocity of the vehicle at intervals of a first period as a standard;

an acceleration calculating unit for calculating an acceleration of the vehicle at intervals of a second period, on the basis of the pulse signals;

a momentary velocity calculating unit for calculating a first momentary velocity at intervals of the first period, on the basis of the average velocity and the acceleration calculated;

an inputting unit which inputs a signal to command an output of calculation results of velocity of the vehicle;

a passing-time measuring unit for measuring a passing time from beginning of the input of velocity pulse signals till the input of the signal to command the output of calculation results; and a momentary velocity estimating unit for estimating a second momentary velocity of the vehicle at a point of time when the signal to command the output of calculation results is inputted, on the basis of the passing time measured by the passing-time measuring unit, the first momentary velocity calculated by the momentary velocity calculating unit and the acceleration calculated by the acceleration calculating unit.

With the above-mentioned arrangement, it is possible to obtain the precise momentary velocity.

In the present invention, preferably, the velocity calculating device further comprises:

a wheel condition judging unit which judges a wheel-locking condition due to the vehicle's rapid braking and a wheel-slipping condition due to the vehicle's rapid accelerating, on the basis of the velocity pulse signals; and an acceleration selecting unit for selecting either one of an acceleration under the wheel-locking condition, an acceleration under the wheel-slipping condition and the acceleration calculated by the acceleration calculating unit, in accordance with a wheel condition judged by the wheel condition judging unit;

wherein the momentary velocity estimating unit calculates the second momentary velocity at the point of time when the signal to command the output of calculation results is inputted, by making use of the acceleration selected by the acceleration selecting unit.

With the above arrangement, since the velocity calculating device of the invention does estimate the second momentary velocity at a point of time when the signal to command the output of calculation results is inputted while selecting the acceleration corresponding to the wheel condition, it is possible to obtain the it is possible to obtain the precise momentary velocity corresponding to the wheel condition.

In the above-mentioned arrangement, more preferably, the velocity calculating device further comprises:

a load condition judging unit for judging a load condition during the vehicle's traveling, on the basis of temperature of outside air and existence or non-existence of rain drops; and an acceleration determining unit for determining the acceleration under the wheel-locking condition or the wheel-slipping condition in accordance with the load condition judged by the load condition judging unit.

In this case, since the velocity calculating device of the invention does estimate the second momentary velocity at a point of time when the signal to command the output of calculation results is inputted while selecting the acceleration corresponding to the load condition, it is possible to obtain the precise momentary velocity corresponding to the load condition.

According to the invention, it is also preferable that the wheel condition judging unit comprises a locking condition judging unit which calculates a pulse period in proportion to the vehicle's velocity estimated in case of the vehicle's rapid braking, and which judges that the vehicle is under the wheel-locking condition, on condition that the velocity pulse signal at present is not inputted within the pulse period in proportion to the estimated vehicle's velocity.

In this case, it is possible to judge that the wheels are under the locked condition, certainly.

According to the invention, it is also preferable that the wheel condition judging unit comprises a slipping condition judging unit which calculates a pulse period in proportion to the vehicle's velocity estimated in case of the vehicle's rapid accelerating, and which judges that the vehicle is under the wheel-slipping condition, on condition that the velocity pulse signal at present is inputted within a period shorter than the pulse period in proportion to the estimated vehicle's velocity.

In this case, it is possible to judge that the wheels are under the slipping condition, certainly.

According to the invention, it is also preferable that the wheel condition judging unit comprises a slipping condition judging unit which calculates an average velocity of the vehicle at predetermined intervals and also calculates the vehicle's acceleration on the basis of both of the previously calculated average velocity and the present average velocity, and which judges that the vehicle is under the wheel-slipping condition, on condition that the so-calculated vehicle's acceleration exceeds a predetermined value.

Also in this case, it is possible to judge that the wheels are under the slipping condition, certainly.

According to the present invention, there is also provided a hood raising apparatus for raising a hood on a front side of a vehicle, the hood raising apparatus comprising:

a collision detecting unit arranged on a front side of the vehicle, for detecting a collision of the vehicle on traveling;

a velocity calculating device which inputs a collision signal, which has been generated from the collision detecting unit, as a signal to command an output of calculation results of velocity of the vehicle, the velocity calculating device comprising:

an average velocity calculating unit which inputs velocity pulse signals representing rotating speed of wheels of the vehicle to calculate an average velocity of the vehicle at intervals of a first period as a standard;

an acceleration calculating unit for calculating an acceleration of the vehicle at intervals of a second period, on the basis of the pulse signals;

a momentary velocity calculating unit for calculating a first momentary velocity at intervals of the first period, on the basis of the average velocity and the acceleration calculated;

an inputting unit which inputs a signal to command an output of calculation results of velocity of the vehicle;

a passing-time measuring unit for measuring a passing time from beginning of the input of velocity pulse signals till the input of the signal to command the output of calculation results; and a momentary velocity estimating unit for estimating a second momentary velocity of the vehicle at a point of time when the signal to command the output of calculation results is inputted, on the basis of the passing time measured by the passing-time measuring unit, the first momentary velocity calculated by the momentary velocity calculating unit and the acceleration calculated by the acceleration calculating unit;

a collision judging unit which outputs an ignition signal when the second momentary velocity generated from the velocity calculating unit is within a predetermined velocity range; and a hood raising unit for raising the hood in response to an output of the ignition signal.

With the above-mentioned arrangement, it is possible to protect an object in front of the vehicle from being damaged.

The above and other features and advantages of this invention will become apparent, and the invention itself will best be understood, from a study of the following description and appended claims, with reference had to the attached drawings showing a preferred embodiment of the invention.

DESCRIPTION OF THE PREFERRED EMBODIMENT

Embodiments of the present invention will be described with reference to the accompanying drawings.

Figure 1:
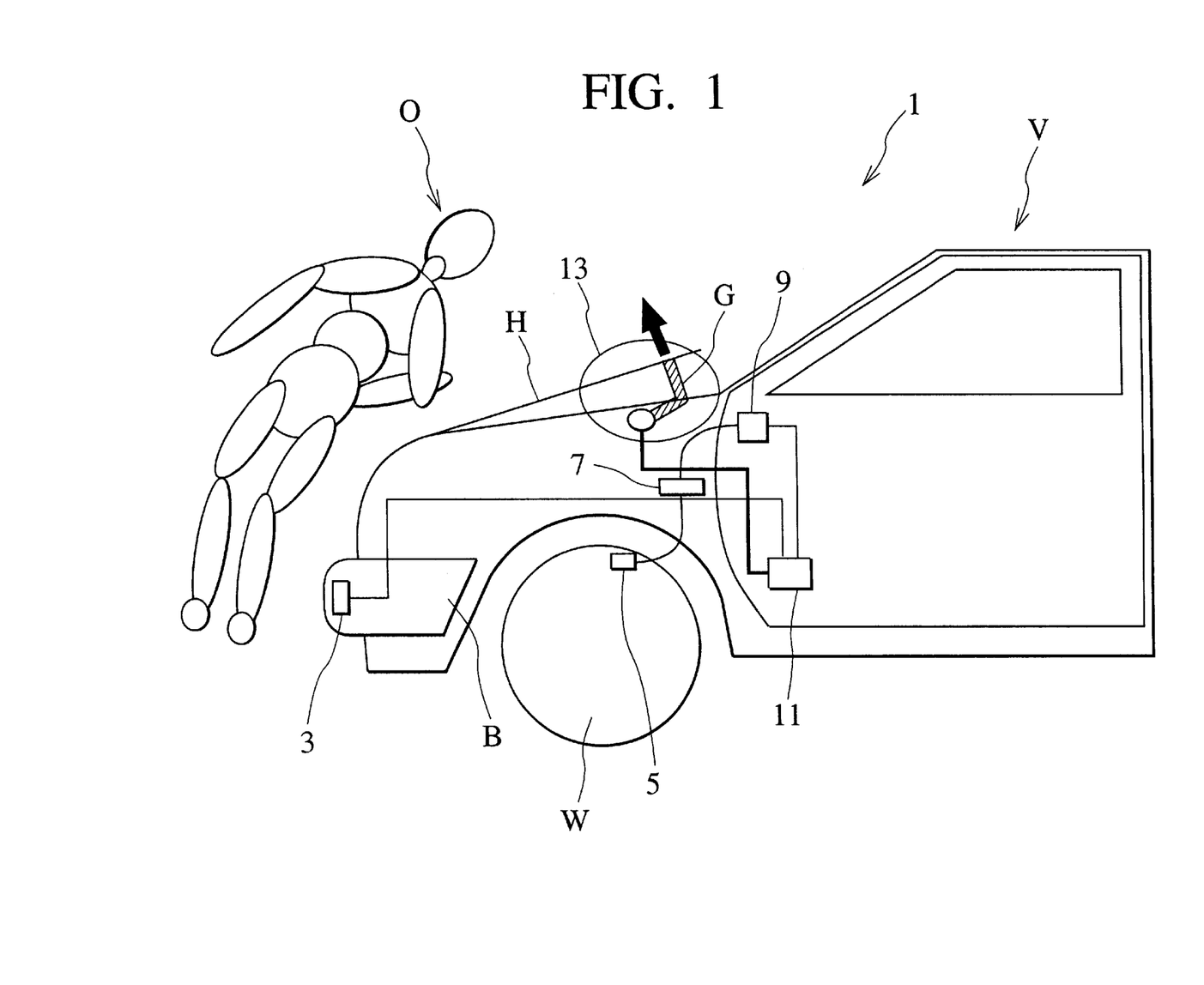
FIG. 1 is a schematic view showing a constitution of a hood raising system in accordance with a first embodiment of the present invention.

FIG. 1 is a schematic view showing a constitution of a hood raising system 1 in accordance with a first embodiment of the present invention.

A collision sensor 3 is disposed in a bumper B on the front side of a vehicle V and constituted by a touch sensor for detecting the collision of vehicle on traveling. A velocity sensor 5 is constituted by a rotary encoder to generate velocity pulse signals representing rotating speed of a wheel (s) W. An anti-lock brake system (ABS) control unit 7 comprises a device which prevents the wheels W from being locked at the time of the vehicle's rapid braking or braking on a slippery load, such as a snow load, by electronically controlling hydraulic pressure on each wheel in response to vehicle pulse signals generated from the velocity sensor 5. A velocity meter 9 serves to display the traveling velocity of the vehicle V corresponding to the velocity pulse signals generated from the velocity sensor 5 through the ABS control unit 7.

A collision detecting device 11 is provided, inside thereof, with a velocity calculating unit. The device 11 generates an ignition signal (a firing signal) when the momentary velocity outputted from the velocity calculating device is within a predetermined velocity range. An actuator 13 includes a hinge G arranged below a hood H of the vehicle V. When the ignition signal is generated from the collision detecting device 11, then the actuator 13 sets fire to squib to thrust up the hinge G, so that the hood H of the vehicle V can be raised.

We now describe the operation of the hood raising system 1 of FIG. 1. As mentioned above, the collision during the vehicle's traveling is detected by the collision sensor 3. Then, as a signal to command an output of calculation results of velocity of the vehicle V, the collision signal from the collision sensor 3 is inputted to the velocity calculating device.

The velocity calculating device to which the velocity pulse signals from the velocity sensor 5 are inputted operates to estimate and output a momentary velocity of the vehicle V corresponding to the collision signal from the collision sensor 3. In the collision detecting device 11, when the momentary velocity is within a predetermined velocity range, for example 20–60 km/h, the ignition signal is generated to the actuator 13 to raise the hood H. Since the judgement of collision is carried out on the basis of the precise momentary velocity estimated by the velocity calculating device, it is possible to contribute to the improvement of accuracy in the hood raising system 1, whereby the protection of an object O can be enhanced.

Figure 2:
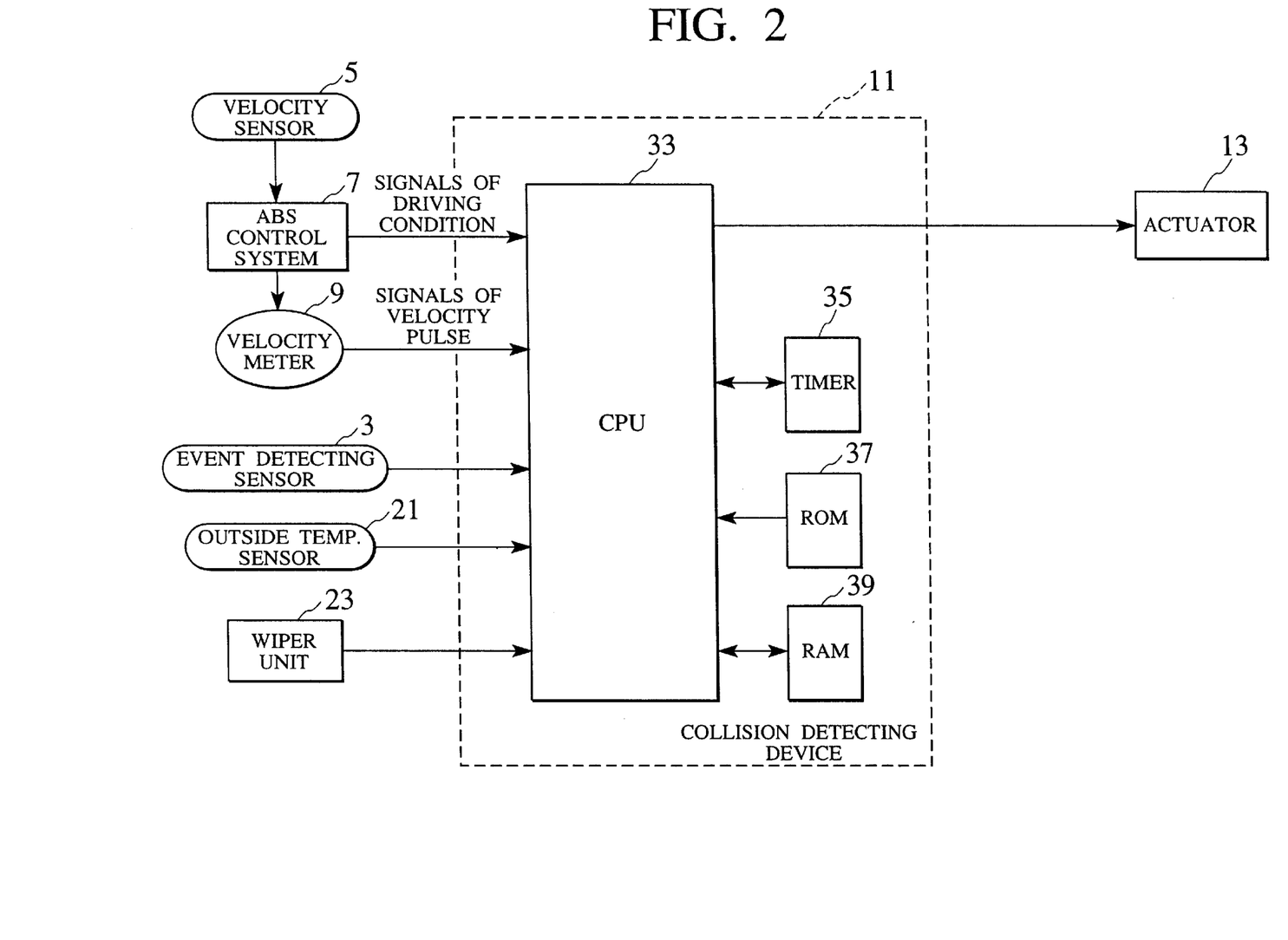
FIG. 2 is a block diagram showing a detailed constitution of the hood raising system.

FIG. 2 is a block diagram showing a detailed constitution of the hood raising system 1. Note, regarding some elements also shown in FIGS. 1 and 2, their overlapping explanations will be deleted from the following description.

An outside temperature sensor 21 serves to detect the temperature of air outside the vehicle V. Being provided with a rain-drop sensor (not shown), a wiper unit 23 is constituted so as to actuate a wiper(s) on a front glass on condition that a rainy condition is detected by the rain-drop sensor. In operation, the wiper unit 23 does output the sensor signals from the rain-drop sensor and an operation signal representing the operating condition of the wiper to the collision detecting device 11.

The collision detecting device 11 comprises a CPU (central processing unit) 33, a timer 35, a ROM 37 and a RAM 39. The CPU 33 controls the operation of the whole device 11 in accordance with a control program stored in the ROM 37. The timer 35, which is provided with a plurality of timer circuits, operates to measure some passing times in nominated timing and in synchronization with rising of the velocity pulse signal etc. The ROM 37 serves to store the control program and a plurality of acceleration rates corresponding to various load conditions. The RAM 39 serves to store a plurality of control data.

Figure 3:
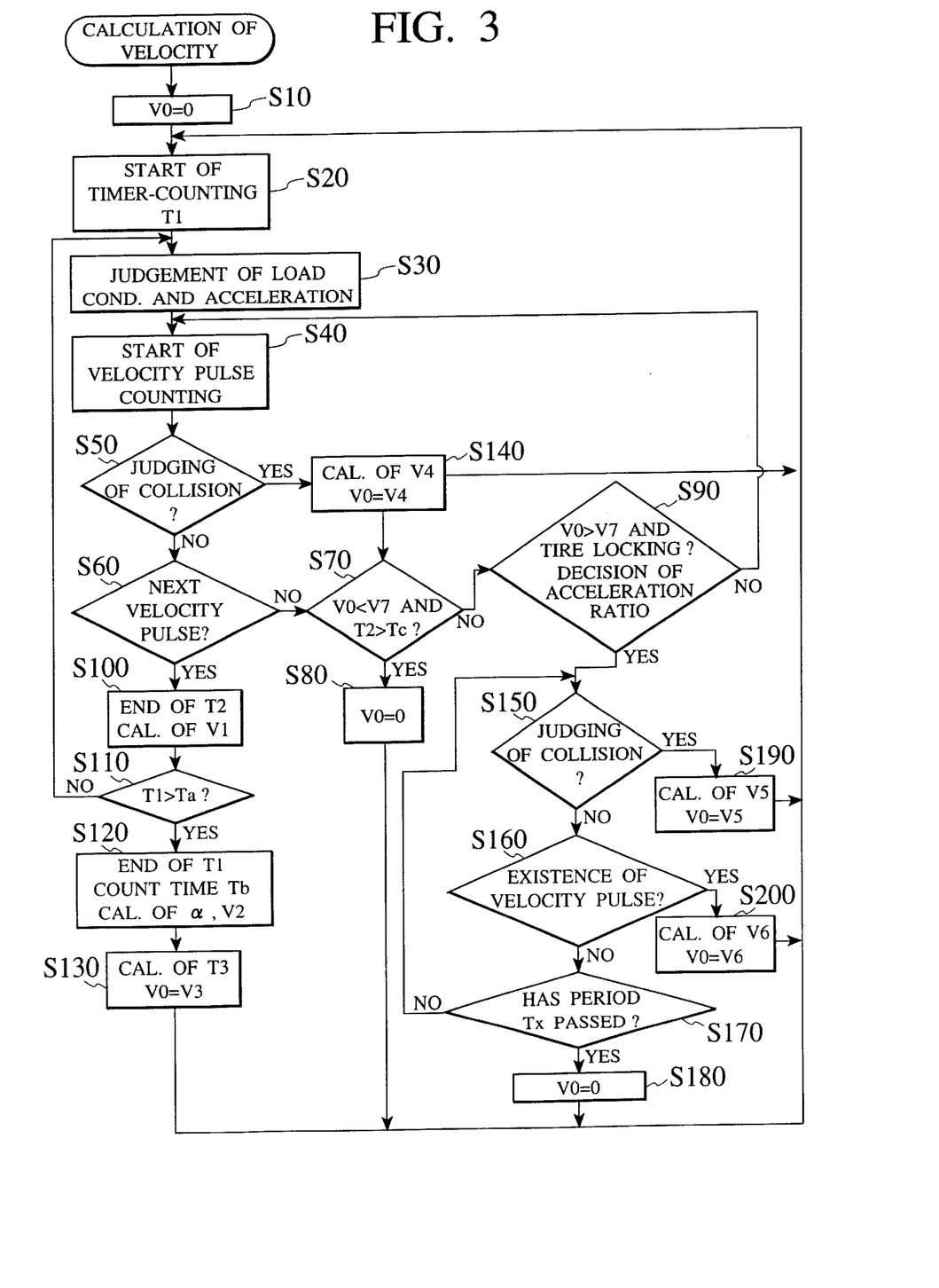
FIG. 3 is a flow chart for explanation of operation of a velocity calculating device which is applicable to a collision judging device.

Referring to FIGS. 4 to 13 and making use of a flow chart of FIG. 3, we now describe an operation of the velocity calculating device which is applicable to the collision detecting device 11. Note, in the embodiment, the velocity calculating device does carry out a velocity calculating process among a variety of processes carried out by the collision detecting device 11. In detail, such a velocity calculating process is executed by the CPU 33 in accordance with the control program stored in the ROM 37.

We now explain an operation of the velocity calculating device, with reference to a case where the vehicle on traveling is rapidly braked so that the tires of the vehicle are locked.

First, at step S10, it is executed by the CPU 33 to establish an initial velocity V0, which is representative of a velocity decided at the present time, as follows:

V0=0

The so-established initial velocity is stored in the RAM 39 for the time being.

Next, at step S20, it is executed to take the velocity pulse signals, which are successively generated from the velocity sensor 5, into the CPU 33. In fact, although the velocity pulse signals from the velocity sensor 5 are introduced into the CPU 33 through the intermediary of the ABS control unit 7 and the sequent velocity meter 9, the following explanation is based on the assumption that the velocity pulse signals are directly inputted to the CPU 33, for the simplicity of explanation.

Figure 4:
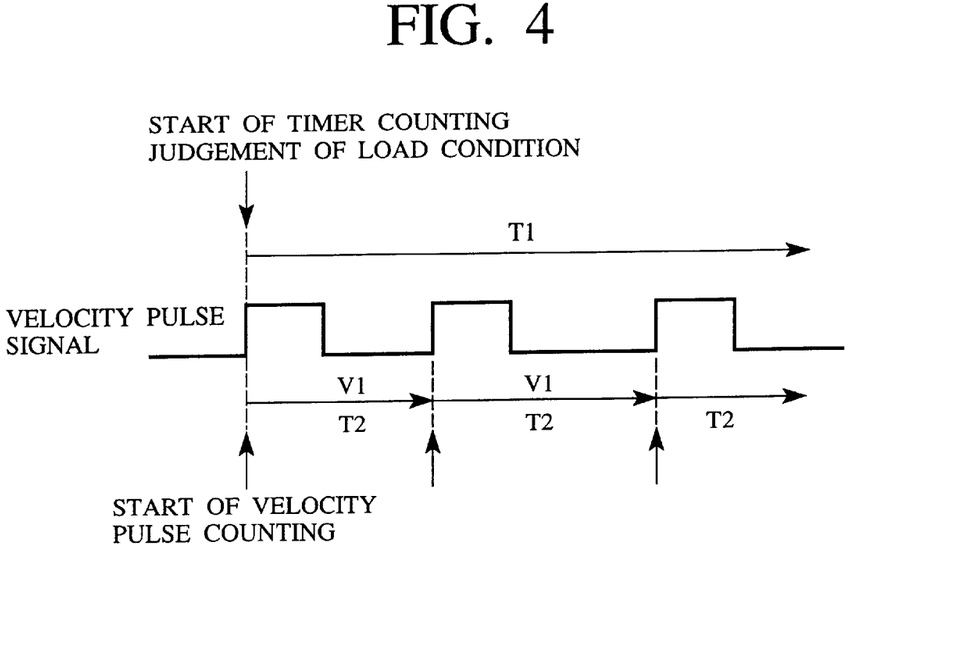
FIG. 4 is a timing chart showing a relationship between velocity pulse signals generated from a velocity sensor and timer counts.

At the same time of inputting the velocity pulse signal from the velocity sensor 5, it is executed by the CPU 33 to allow one of the plural timer circuits in the timer 35 to start timer-counting of T1, as shown in FIG. 4.

At next step S30, on the basis of the driving signals outputted from the ABS control unit 7, the CPU 33 operates to judge which of DRY, WET and SNOW conditions the load condition does have. In addition, the judgement of load condition is carried out at the same time of starting timer-counting of T1.

In place of signals representing the driving condition generated from the ABS control unit 7, the load condition of DRY, WET or SNOW may be judged on the basis of the sensor signals from the outside temperature sensor 21 and the wiper unit 23. For example, when the temperature of the air outside detected by the outside temperature sensor 21 is less than 0° C., then it is judged that the load is under the SNOW condition. Further, when the temperature of the air outside is more than 0° C. while using the wiper unit 23, it is judged that the load is under the WET condition. In other cases except the above cases, it is judged that the load is under the DRY condition.

Figure 5:
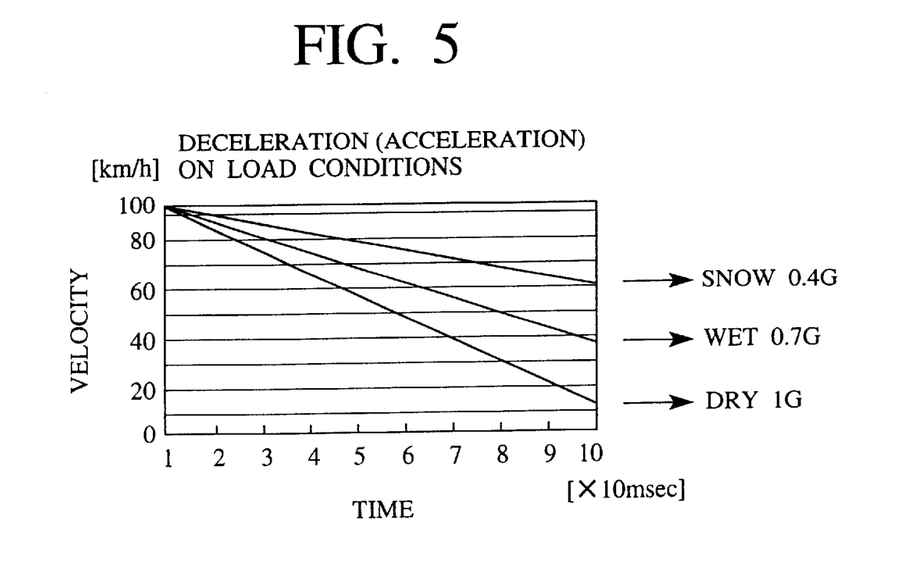
FIG. 5 is a graph showing a change of velocity when tires are locked.

In addition, at step S30, it is also executed to read an acceleration β of the vehicle V having the tires locked, from the ROM 37 on the basis of the determined load condition. The acceleration rate β determined in this way is then stored in the RAM 39. Note, as the accelerations β corresponding to the present various load conditions, it is determined of 1 G in the DRY condition, 0.7 G in the WET condition and 0.4 G in the SNOW condition. FIG. 5 is a practically measured graph showing the change of velocity in case that the vehicle traveling at e.g. 100 k/h is braked rapidly and the tires are locked. From this graph, it will be understood that different accelerations (or decelerations) are applied to the DRY, WET and SNOW conditions, respectively. When the tires are locked, then the vehicle is brought into a traveling condition of inertia, so that decelerating action due to friction between the tires and the load and air resistance is applied on the vehicle. Note, in the embodiment, the acceleration is representative of a changing rate of velocity in case of applying such a decelerating action on the vehicle. Further, in the embodiment, the acceleration is expressed by a numerical value of a coefficient times gravitational acceleration G.

At next step S40, by the CPU 33, it is executed to allow the other timer circuit of the plural timer circuits in the timer 35 to start timer-counting of T2, so that the velocity V1 for each of the velocity pulse signals is calculated. It should be noted that the velocity V1 may be obtained by dividing the whole periphery of tire by a period corresponding to timer-counting of T2.

At next step S50, by monitoring the situation of the collision sensor 3, it is executed to judge whether the collision has occurred in the vehicle. When it is judged that the collision has occurred, then the routine goes to step S140. On the contrary, if the judgement at step S50 is No, the routine goes to step S60.

At step S60, it is monitored whether the next velocity pulse signal is inputted from the velocity sensor 5. If the next velocity pulse signal is inputted, the routine goes to step S100. If not, the routine goes to step S70.

Figure 6:
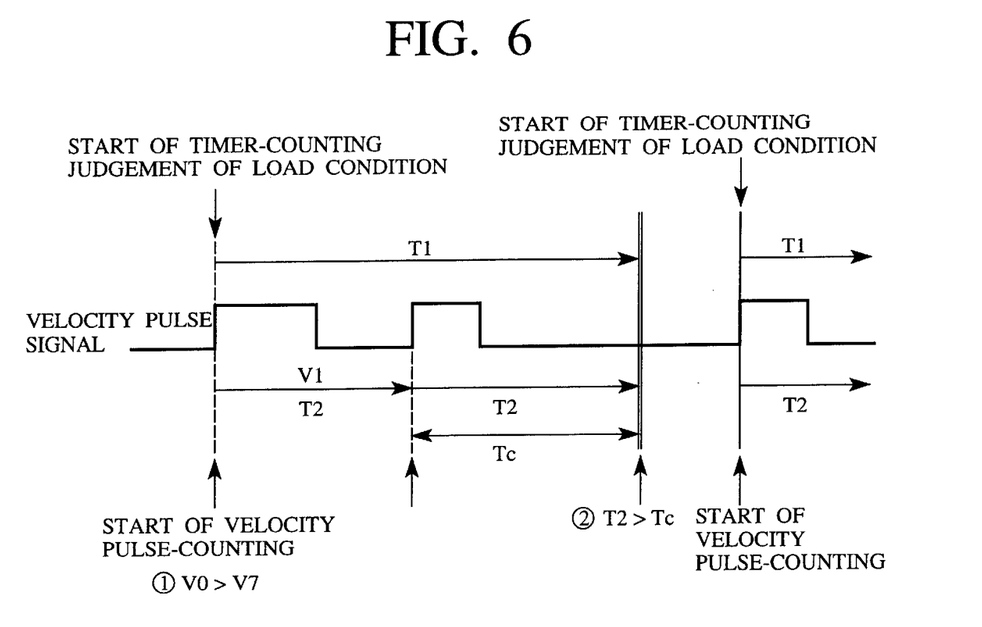
FIG. 6 is a timing chart showing a situation to judge load conditions on the basis of velocity pulse signals generated from the velocity sensor and the timer counts.

At next step S70, as shown in FIG. 6, it is judged whether the velocity V0 is less than a predetermined standard velocity V7;

$$V0<V7$$

and also judged whether the timer count of T2 is more than a predetermined standard period Tc.

$$T2>Tc.$$

If both of the above conditions are satisfied, then the routine goes to step S80. While, if both of the above conditions are not satisfied, then the routine goes to step S90.

At next step S80, so long as the next velocity pulse signal is not inputted, it is executed to allow the timer 35 to complete the timer count T1, T2 and establish the present velocity V0 of zero.

$$V0=0.$$

Thereafter, the routine returns to step S20. On and after step S20, when the velocity pulse signal is again inputted from the velocity sensor 5, then it will be newly executed to allow the timer 35 to start timer-counting of T1 and T2 and judge the load condition.

On the other hand, if the judgement at step S70 is No, the routine goes to step S90 where it is judged whether the velocity V0 is more than the predetermined velocity V7;

$$V0>V7$$

and also judged whether the tires of the vehicle are under the locked condition.

Then, if both of the above conditions of step S90 are satisfied, the routine goes to step S150. Conversely, if not, the routine goes to step S190.

Figure 7:
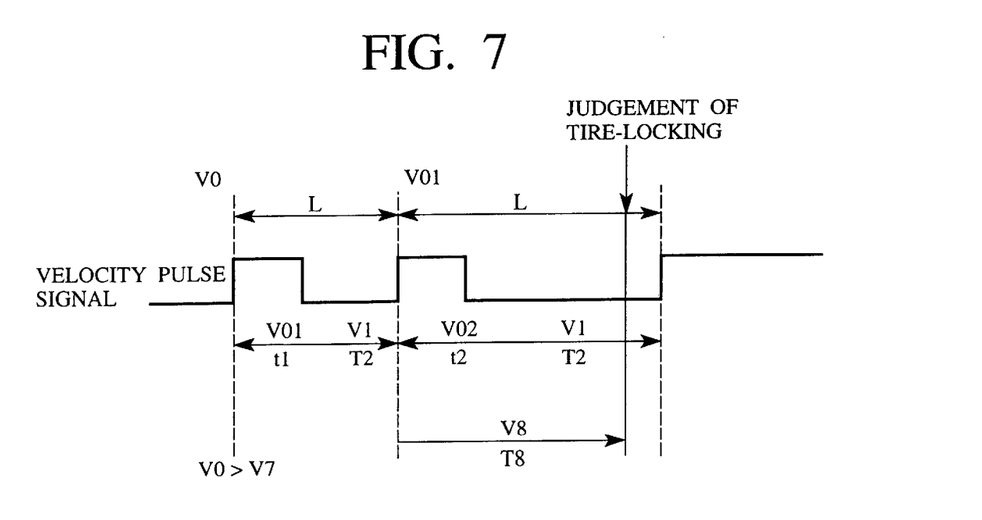
FIG. 7 is a timing chart showing a situation to judge tire-locking conditions on the basis of velocity pulse signals generated from the velocity sensor and the timer counts.

Now, with reference to FIG. 7, we describe how to judge whether or not the tires are under the locked condition.

First, by using the timer 35, it is executed to count the period T2 for each velocity pulse signal and add all of the periods T2 within a certain period T3. Providing that the whole period of the periods T2 is represented by t1, it can be expressed by the following expression:

$$t1=T2+T2+\ldots$$

In addition, it is executed for every velocity pulse signals to calculate an estimated velocity V01 for the sequent velocity pulse signal by the following expression. Note, the velocities V1 have been calculated as usual.

$$V01=V0-\alpha \times t1$$

When the vehicle is rapidly braked for its rapid deceleration on the ground of the estimated velocity V01 and the acceleration β corresponding to the actual load condition, the estimated velocity V8 of the sequent velocity pulse signal generated from the velocity sensor 5 is obtained by the following expression.

$$V8=V01- \times t2$$

Here, if the next velocity pulse signal is not inputted for a period longer than the period T8 of the velocity pulse signal corresponding to the estimated velocity V8, then it is judged that the tires are under locked condition.

Now, we describe how to determine the period t2.

First of all, since two velocity pulse signals are outputted with respect to one revolution of the tire, the following relationship among a distance L corresponding to two velocity pulse signals, the period t and the velocity is established as shown in FIG. 7:

$$L=V01 \times t1=V02 \times t2$$

and $$V02=V01 \times t1/t2$$

If the vehicle is accelerated with the acceleration β, the velocity V02 is expressed as below:

$$V02=V01-\beta \times t2$$

Here, as shown in FIG. 7, when the following relationship between the period t2 and the period T8 is established:

$$t2>T8,$$

then it is judged that the tires are being under the locked condition.

Figure 8:
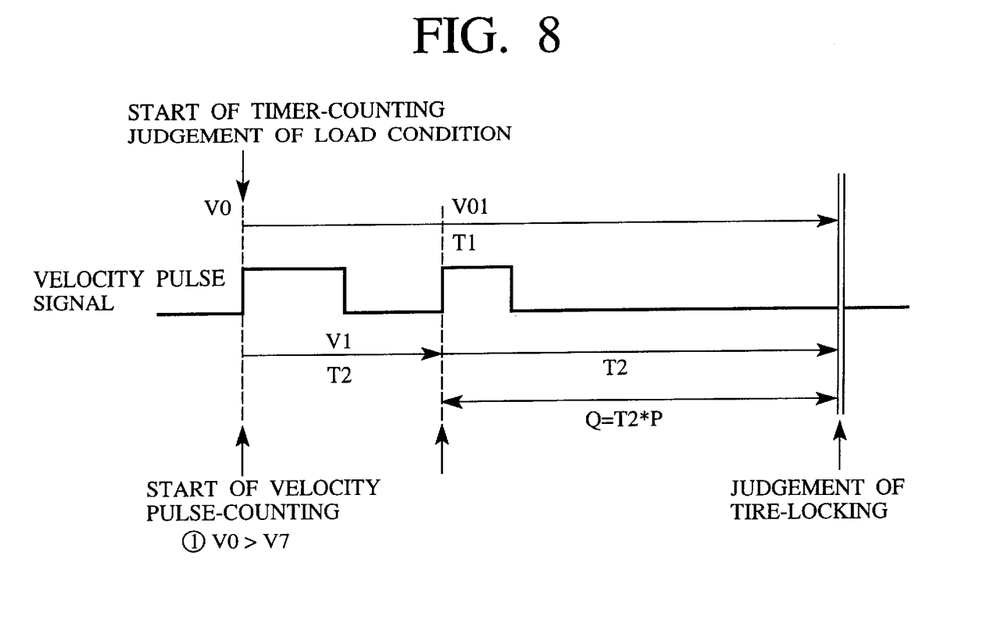
FIG. 8 is a timing chart showing a situation to judge tire-locking conditions on the basis of velocity pulse signals generated from the velocity sensor and the timer counts.

Referring to FIG. 8, we now describe another method of judging whether the tires are under the locked condition or not.

First of all, after calculating the estimated velocity V01 as mentioned above, when there is no velocity pulse signal from the velocity sensor 5 within a period Tq equal to (P) times as long as the cycle of the estimated velocity V01, then it is judged that the tires of the vehicle are being under the locked condition.

In case of judging the tires are under the locked condition, it is carried out to calculate an estimated standstill period Tx (V0=0) on the basis of the acceleration β corresponding to the load condition and the estimated velocity V0.

At step S100, it is executed to complete the timer counting of T2 by the timer 35 and calculate the velocity V1 for every velocity pulse signals.

Figure 9:
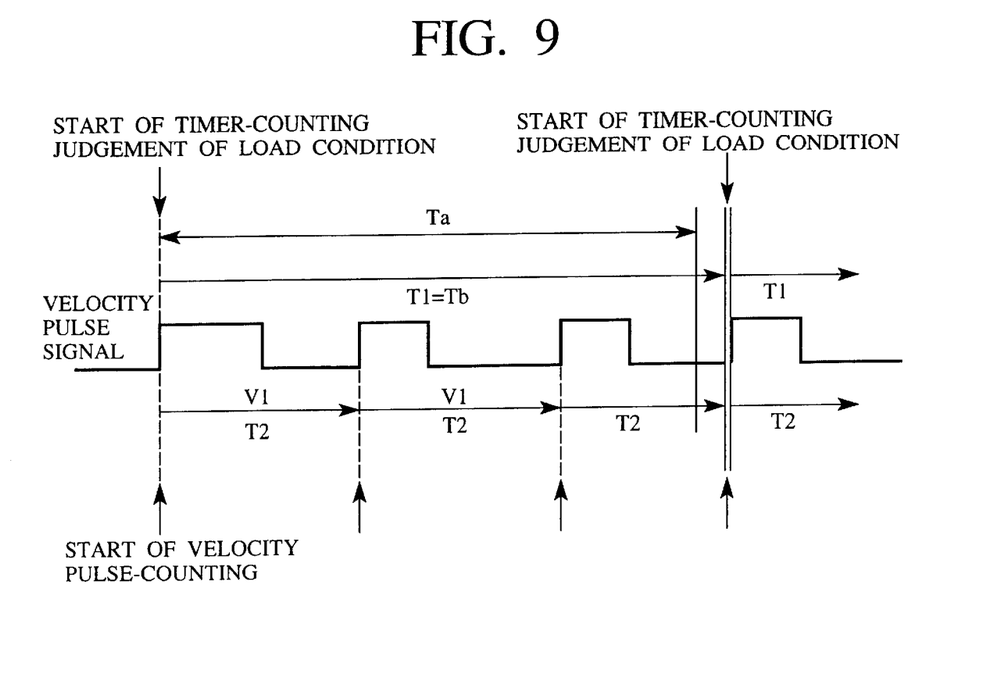
FIG. 9 is a timing chart showing a situation to judge load conditions on the basis of velocity pulse signals generated from the velocity sensor and the timer counts.

In FIG. 9, the calculation of velocity V1 has been continued until the timer count T1 exceeds a certain period Ta. When the timer count T1 exceeds the period Ta and the timer counting of T2 is completed, then it is executed to calculate a period Tb from the start of timer counting of T1 till the end of the same.

Next, it is executed to calculate the acceleration α by an average of velocity V1 squared in the period Tb. Hereat, it is executed to calculate the average velocity V2 in the period Tb. That is, the number of high level or low level of the velocity pulse signals generated in the period Tb is counted to calculate the velocity V2.

At step S110, it is carried out to confirm whether or not the timer count T1 exceeds the predetermined period Ta as a standard.

If the judgement at step S110 is Yes, then the routine goes to step S120 where the period Tb from the start of the timer count T1 to the end is calculated.

Figure 10:
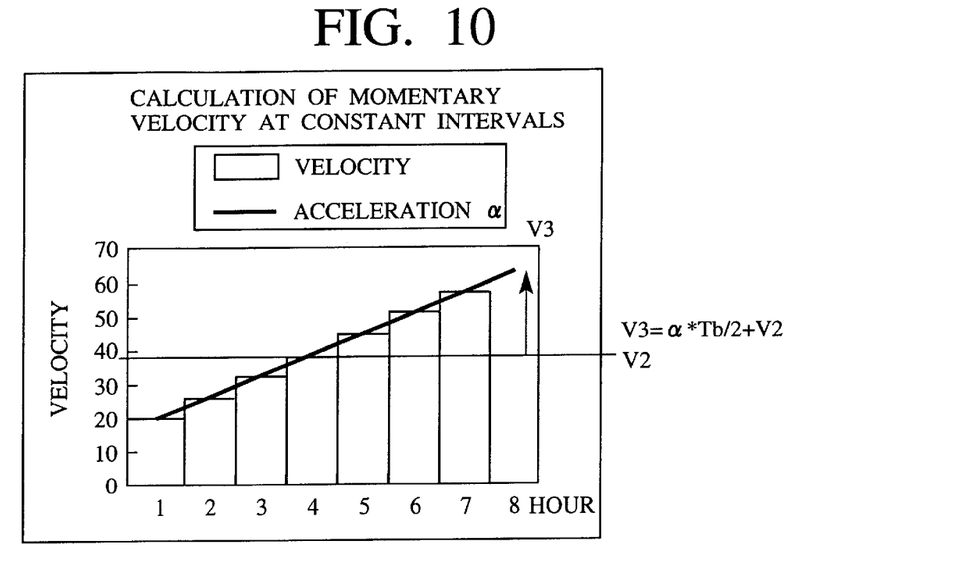
FIG. 10 is a diagram showing velocity and acceleration ratio in case of calculating momentary velocity at regular intervals.

At step 120, it is also executed to calculate the acceleration α by the average of velocity V1 squared and calculate the average velocity V2 in the period Tb. That is, the number of high level or low level of the velocity pulse signals in the period Tb is counted to calculate the velocity V2. At next step S130, for the present velocity V0, it is executed to calculate the momentary velocity V3 at predetermined intervals as a standard in the period Tb. In this calculating process of the momentary velocity, it is executed to calculate the velocity when the timer count T1 is equal to Tb. Referring to FIG. 10, the momentary velocity V3 at predetermined standard intervals is obtained by the following expression.

$$V3=\alpha \times Tb/2+V2$$

where a is the acceleration;
Tb/2 is a period; and
V2 is the average of velocity.

Hereat, the present velocity V0 is established as below.

V0=V3

Figure 11:
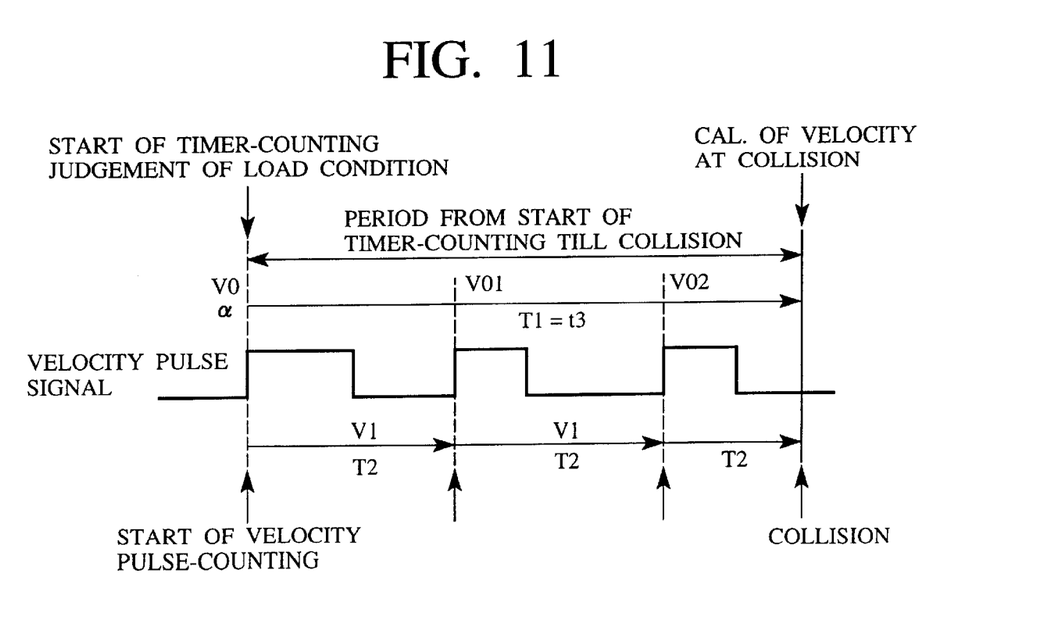
FIG. 11 is a timing chart showing velocity pulse signals generated from the velocity sensor and a situation from start of timer counting till collision.

On the other hand, at step S50, when it is judged that the collision has occurred, the routine goes to step S140 where the momentary velocity V4 at the time of collision is calculated by the following expression (see FIG. 11):

$$V4=V0+\alpha \times t3 \quad (\alpha: \text{fixed value})$$

where t3 is a passing period from the start of timer counting T1 till the collision; and V0 is the present velocity.

In this way, according to the invention, while the velocity pulse signals from a velocity sensor 5 are inputted to the CPU 33, it is executed to calculate average velocity V2 at intervals of the standard period T2 (first interval) and the acceleration α at intervals of a period Tb (second interval) on the basis of the velocity pulse signals. Next, on the basis of the calculated average velocity V2 and the acceleration α, the momentary velocity V3 (first momentary velocity) at intervals of the period Tb is calculated. Further, it is carried out to measure the passing of time t3 from the input of velocity pulse signal till a time when the output of calculation results is required, while momentary velocity V4 (second momentary velocity) at a point of time when the output of calculation results is required is estimated on the basis of the momentary velocity V3 and the acceleration α. Therefore, it is possible to obtain the precise momentary velocity. When the condition at step S90 is satisfied, the routine goes to step S150 where it is judged whether the vehicle has the collision by monitoring the output of the collision sensor 3. When the vehicle has the collision, then the routine goes to step S200. On the contrary, when the vehicle has not the collision, the routine goes to step S160.

Figure 12:
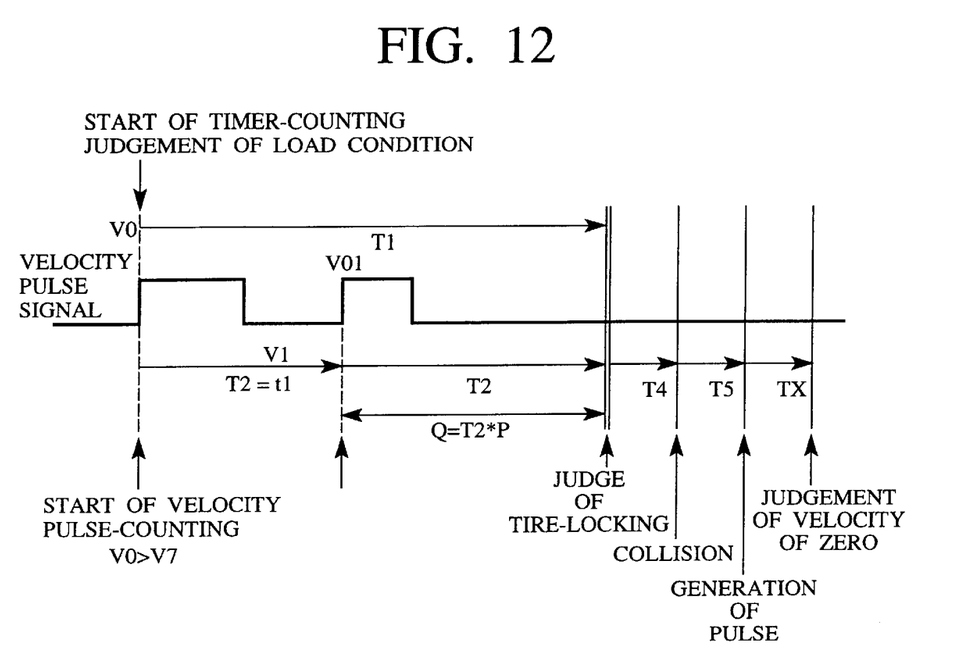
FIG. 12 is a timing chart showing a situation to judge tire-locking conditions on the basis of velocity pulse signals generated from the velocity sensor and the timer counts.

We now refer to FIG. 12.

At step S160, it is executed to monitor whether the velocity pulse signal is inputted from the velocity sensor 5. When the velocity pulse signal is inputted, then the routine goes to step S200. On the other hand, when the signal is not inputted, the routine goes to step S170.

At step S170, it is executed to monitor whether or not a period that the locking condition of tires has been continued is more than a period Tx. When the locking condition has been continued for a period more than the period Tx, then the routine goes to step S180. If not, the routine returns to step S150.

Next, at step S180, it is executed to establish the present velocity V0 of zero.

V0=0

Hereat, at step S190, it is executed to calculate the momentary velocity V5 at the time of the collision by the following expression:

$$V5=V01+\beta \times T4$$

where T4 is a period of the estimated velocity V01 from the start of the velocity pulse count T1 till the collision; and β is the acceleration.

In addition, it is executed to regard the calculated momentary velocity V5 as the present velocity V0 at the collision.

V0=V5

When the velocity pulse signal is outputted from the velocity sensor 5 during the period Tx where the tires have been locked, it is executed to stop the timer counting of T1 due to the velocity pulse signal, as shown in FIG. 12. At step S200, the momentary velocity V6 at the collision is calculated from the period T5 from the start of pulse counting of the estimated velocity V01 till its stop and the acceleration α.

$$V6=V01+\beta \times T5$$

In addition, it is executed to regard the calculated momentary velocity V6 as the present velocity V0 at the collision.

V0=V6

Figure 13:
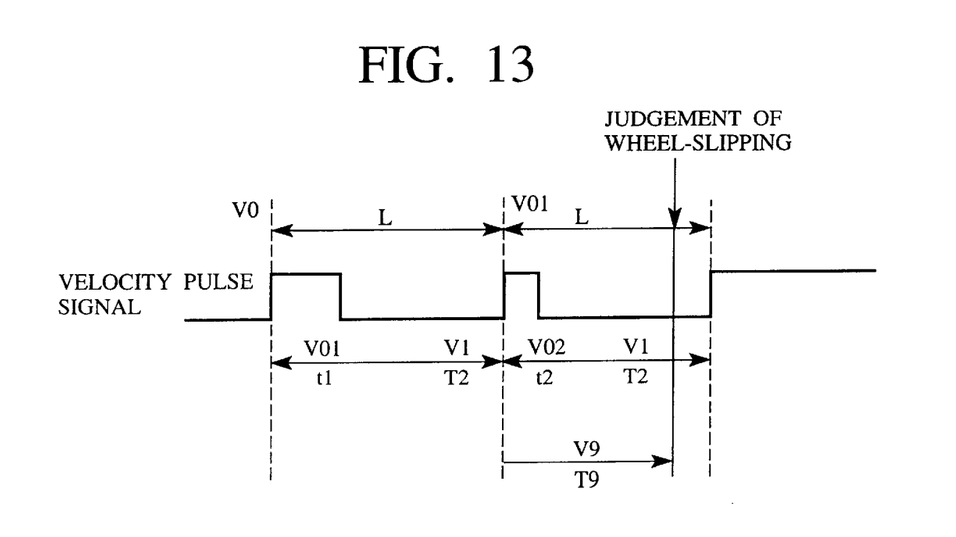
FIG. 13 is a timing chart showing a situation to judge tire-slipping conditions on the basis of velocity pulse signals generated from the velocity sensor and the timer counts.

Now, referring to FIG. 13, we describe how to detect that the tires are slipping at the time of the vehicle's rapid accelerating.

First, by using the timer 35, it is executed to count the period T2 for each velocity pulse signal and add all of the periods T2 within a certain period Ta. Providing that the whole period of the periods T2 is represented by t1, it can be expressed by the following expression:

$$t1=T2+T2+\ldots$$

In addition, it is executed for every velocity pulse signals to calculate an estimated velocity V01 for the sequent velocity pulse signal by the following expression. Note, the velocities V1 have been calculated as usual.

$$V01=V0-\alpha \times t1$$

Note, the velocities V1 have been calculated as usual.

When braking the vehicle for rapid deceleration on the basis of the estimated velocity V01 and the acceleration r corresponding to the load condition, the estimated velocity V9 of the sequent velocity pulse signal generated from the velocity sensor 5 is obtained by the following expression:

$$V9=V01-\gamma \times t2$$

For example, under wheel slipping condition caused by the vehicle's rapid accelerating from its standstill, the velocity changes from zero to e.g. approx. 20 km/h.

As shown in FIG. 13, when the vehicle pulse signal is shorter than a cycle T9 of the velocity pulse signal at the estimated velocity V9, it can be judged that the vehicle is under the wheel-slipping condition.

At first, by using the timer 35, it is executed to count the period T2 for each velocity pulse signal and add all of the periods T2 within a certain period Ta. Providing that the whole period of the periods T2 is represented by t1, it can be expressed by the following expression:

$$t1=T2+T2+\ldots$$

During the whole period t1, it is executed to continue to measure the velocities V1 , V2.

Making use of a fact that the wheels of the vehicle stop temporarily when the wheel-slipping condition is completed, it is carried out to calculate the average velocity V2 at predetermined. intervals. Providing that the average velocity V2 under the wheel-slipping condition is higher than a certain velocity (e.g. 10 km/h), the end of wheel-slipping condition is judged in case that the sequent average velocity is less than 10 km/h. Thereafter, the above-mentioned normal calculation of momentary velocity is carried out.

We now describe another method of judging the wheel-slipping condition.

It is executed to calculate the acceleration with respect to the average velocity V2 at certain intervals on the basis of the previous average velocity V2 and the present average velocity V2. Then, when the so-calculated acceleration exceeds a predetermined value (i.e. an acceleration being possible in only wheel-slipping condition) as a standard, then it is judged that the vehicle is under the wheel-slipping condition.

Finally, it will be understood by those skilled in the art that the foregoing description relates to preferred embodiments of the disclosed velocity calculating device and the hood raising system, and that various changes and modifications may be made to the present invention without departing from the spirit and scope thereof.

What is claimed is:

1. A hood raising apparatus for raising a hood on a front side of a vehicle, the hood raising apparatus comprising:
   a collision detecting unit arranged on a front side of the vehicle, for detecting a collision of the vehicle on traveling;
   a velocity calculating device which inputs a collision signal, which has been generated from the collision detecting unit, as a signal to command an output of calculation results of velocity of the vehicle, the velocity calculating device comprising:
      an average velocity calculating unit which inputs velocity pulse signals representing rotating speed of wheels of the vehicle to calculate an average velocity of the vehicle at intervals of a first period as a standard;
      an acceleration calculating unit for calculating an acceleration of the vehicle at intervals of a second period, on the basis of the pulse signals;
      a momentary velocity calculating unit for calculating a first momentary velocity at intervals of the first period, on the basis of the average velocity and the acceleration calculated;
      an inputting unit which inputs a signal to command an output of calculation results of velocity of the vehicle;
      a passing-time measuring unit for measuring a passing time from beginning of the input of velocity pulse signals till the input of the signal to command the output of calculation results; and
      a momentary velocity estimating unit for estimating a second momentary velocity of the vehicle at a point of time when the signal to command the output of calculation results is inputted, on the basis of the passing time measured by the passing-time measuring unit, the first momentary velocity calculated by the momentary velocity calculating unit and the acceleration calculated by the acceleration calculating unit;
   a collision judging unit which outputs an ignition signal when the second momentary velocity generated from the velocity calculating unit is within a predetermined velocity range; and
   a hood raising unit for raising the hood in response to an output of the ignition signal.

2. A hood raising apparatus of claim 1, further comprising:
   a wheel condition judging unit which judges a wheel-locking condition due to the vehicle's rapid braking and a wheel-slipping condition due to the vehicle's rapid accelerating, on the basis of the velocity pulse signals; and
   an acceleration selecting unit for selecting either one of an acceleration under the wheel-locking condition, an acceleration under the wheel-slipping condition and the acceleration calculated by the acceleration calculating unit, in accordance with a wheel condition judged by the wheel condition judging unit;
   wherein the momentary velocity estimating unit calculates the second momentary velocity at the point of time when the signal to command the output of calculation results is inputted, by making use of the acceleration selected by the acceleration selecting unit.

3. A hood raising apparatus of claim 2, further comprising:
   a load condition judging unit for judging a load condition during the vehicle's traveling, on the basis of temperature of outside air and existence or non-existence of rain drops; and
   an acceleration determining unit for determining the acceleration under the wheel-locking condition or the wheel-slipping condition in accordance with the load condition judged by the load condition judging unit.

4. A hood raising apparatus of claim 2, wherein the wheel condition judging unit comprises a locking condition judging unit which calculates a pulse period in proportion to the vehicle's velocity estimated in case of the vehicle's rapid braking, and which judges that the vehicle is under the wheel-locking condition, on condition that the velocity pulse signal at present is not inputted within the pulse period in proportion to the estimated vehicle's velocity.

5. A hood raising apparatus of claim 2, wherein the wheel condition judging unit comprises a slipping condition judging unit which calculates a pulse period in proportion to the vehicle's velocity estimated in case of the vehicle's rapid accelerating, and which judges that the vehicle is under the wheel-slipping condition, on condition that the velocity pulse signal at present is inputted within a period shorter than the pulse period in proportion to the estimated vehicle's velocity.

6. A hood raising apparatus of claim 2, wherein the wheel condition judging unit comprises a slipping condition judging unit which calculates an average velocity of the vehicle at predetermined intervals and also calculates the vehicle's acceleration on the basis of both of the previously calculated average velocity and the present average velocity, and which judges that the vehicle is under the wheel-slipping condition, on condition that the so-calculated vehicle's acceleration exceeds a predetermined value.

* * * * *